United States Patent
Kobayashi et al.

(10) Patent No.: US 6,179,459 B1
(45) Date of Patent: Jan. 30, 2001

(54) TWIN EXTRUDER

(75) Inventors: Nobuhisa Kobayashi; Yukio Imamura, both of Hiroshima (JP)

(73) Assignee: The Japan Steel Works, Ltd., Tokyo (JP)

( * ) Notice: Under 35 U.S.C. 154(b), the term of this patent shall be extended for 0 days.

(21) Appl. No.: 09/226,132

(22) Filed: Jan. 7, 1999

(30) Foreign Application Priority Data

Mar. 24, 1998 (JP) .................................. 10-075665

(51) Int. Cl.$^7$ .................................. B28C 7/16; B29B 7/46
(52) U.S. Cl. .................................. 366/77; 366/83; 366/88; 425/204; 425/202
(58) Field of Search .................................. 366/83, 84, 85, 366/86, 96, 77, 88, 90, 91, 297, 300, 301; 425/204, 202

(56) References Cited

U.S. PATENT DOCUMENTS

| | | | | |
|---|---|---|---|---|
| 3,224,739 | * | 12/1965 | Schuur | 425/204 |
| 3,577,588 | * | 5/1971 | Chisholm | 425/131.1 |
| 3,667,733 | * | 6/1972 | Fritsch | 366/85 |
| 3,746,319 | * | 7/1973 | Blach | 366/85 |
| 3,764,118 | * | 10/1973 | Matsuoka | 366/84 |
| 4,212,543 | * | 7/1980 | Bersano | 366/85 |
| 4,707,139 | * | 11/1987 | Valenzky et al. | 366/77 |
| 5,179,521 | * | 1/1993 | Edge | 366/77 |
| 5,409,366 | * | 4/1995 | Vincent | 366/85 |

FOREIGN PATENT DOCUMENTS

| | | | |
|---|---|---|---|
| 1937 547 | 7/1969 | (DE) . | |
| 2 003 593 | 1/1970 | (DE) . | |
| 28 34 043 | 8/1978 | (DE) . | |
| 557562 | * 2/1957 | (IT) | 425/204 |
| 57-199638 | * 12/1982 | (JP) . | |
| 4-156932 | * 5/1992 | (JP) | 366/83 |

* cited by examiner

Primary Examiner—Tony G. Soohoo
(74) Attorney, Agent, or Firm—Sughrue, Mion, Zinn, Macpeak & Seas, PLLC

(57) ABSTRACT

In a twin extruder wherein an underwater cutting apparatus 12 is connected, via a gear pump 9, to an discharge port 8 of a cylinder 1 which houses therein twin screws both ends of which are supported, both sides of both screws 2, 3 are material conveying sections 5a, 5b having flights of small lead, the downstream sides of the respective material conveying sections 5a, 5b are kneading sections 6a, 6b having flights of large lead, both kneading sections 6a, 6b are connected about the center of the screws 2, 3, and the cylinder 1 positioned at the center of the screws 2, 3 is provided with the discharge port 8.

4 Claims, 2 Drawing Sheets

TWIN EXTRUDER

BACKGROUND OF THE INVENTION

1. Field of the Invention

The present invention relates to a twin extruder, and more specifically to a twin extruder where an underwater cutting apparatus is connected, via a gear pump, to a side portion or a lower portion of a cylinder which houses therein twin screws whose both ends are supported.

2. Related Art

This kind of twin extruder conventionally used is composed as shown in FIG. 3. In the same, reference numeral 21 designates a cylinder in which a pair of first screw 22 and second screw 23 are disposed. Both screws 22, 23 are sealed at both ends thereof with sealing members 24, 24a, and supported by not shown bearings.

Both screws 22, 23 are composed of a material supplying section 25 having a flight of small lead and a kneading section 26 having a flight of large lead. The flights of both screws 22, 23 are inverse helical screws with respect to each other. Both screws are rotation driven by a not shown motor outward or inward each other (in this case, the flight is the inverse helical lead with respect to the figure), when seeing the upper parts of the screws from a drive source.

The cylinder 21 is provided with a material supplying hopper 27 about the upper part thereof corresponding to the material supplying section 25.

The cylinder 21 is provided with an discharge port 28 at the side or lower part thereof positioned at the downstream of the kneading section 26. The discharge port 28 is provided in order with a gear pump 29, a screen changer 30, a die 31 and an underwater cutting apparatus 32.

Explanation will be made to actuation of the above mentioned twin extruder.

Resin material charged into the cylinder 21 from the hoppers 27 is transferred to the material conveying section 25 and the kneading section 26, and is molten and kneaded. The molten and kneaded resin is sent to a downstream gear pump 29 from the discharge port 28, goes through the screen changer 30, the die 31 an the underwater cutting apparatus 32, and pelletized.

Since the prior art twin extruder is composed as mentioned above, there exist the following problems.

(*a*) Since the axes are sealed under pressure with sealing members at the side of the discharge port of the cylinder, secure sealing is difficult.

(*b*) Since thermal expansion should be absorbed at the discharge port, centering of the underwater cutting apparatus is difficult.

(*c*) With respect to the diameter of the screw, amounts to be processed are limited.

SUMMARY OF THE INVENTION

It is an object of the present invention to make easy sealing of the axes of the twin extruder having the cylinder housing therein twin screws whose both ends are supported, and the underwater cutting apparatus is connected to the side part or the lower part of the cylinder, make centering of the underwater cutting apparatus easy, and increase amounts to be processed with the screws of the same diameter.

The twin extruder of the present invention, in which an underwater cutting apparatus is connected, via a gear pump, to an discharge port of a cylinder housing therein twin screws both ends of which are supported, is characterized in that both sides of both screws are material conveying sections having flights of small lead, the downstream sides of the respective material conveying sections are kneading sections having flights of large lead, both kneading sections are connected about the center of the screws and the cylinder positioned at the center of the screws is provided with the discharge port.

DETAILED DESCRIPTION OF THE PREFERRED EMBODIMENTS

Explanation will be made to an embodied invention in accordance with an embodiment, referring to the attached drawings.

Figure 1:
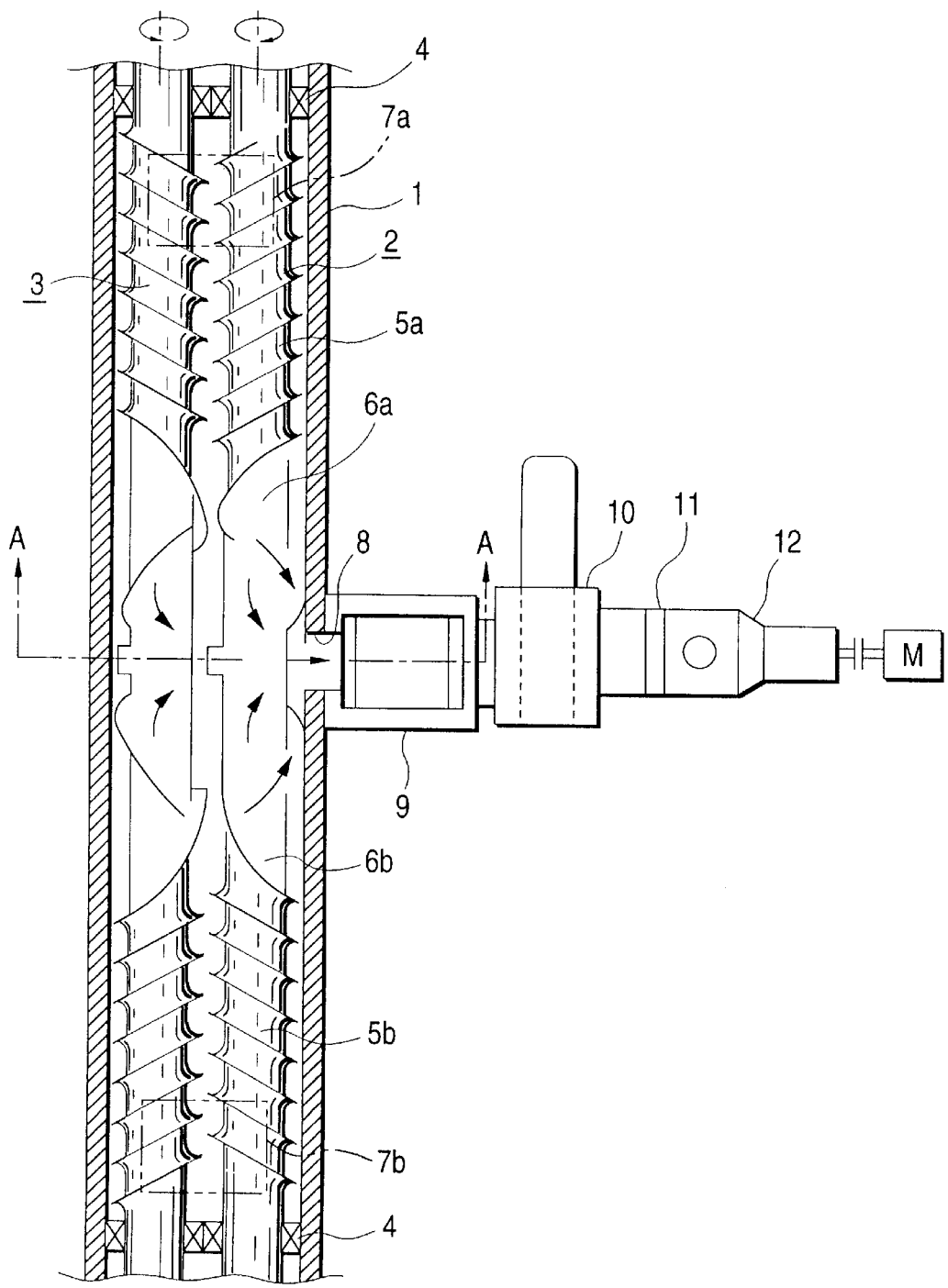
FIG. 1 is showing the whole structure of the twin extruder according to the present invention.
Figure 2:
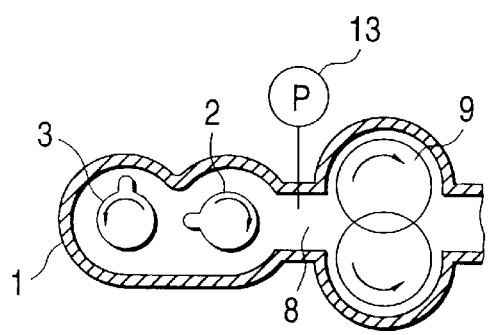
FIG. 2 is showing he cross sectional view along A—A line of FIG. 1.
Figure 3:
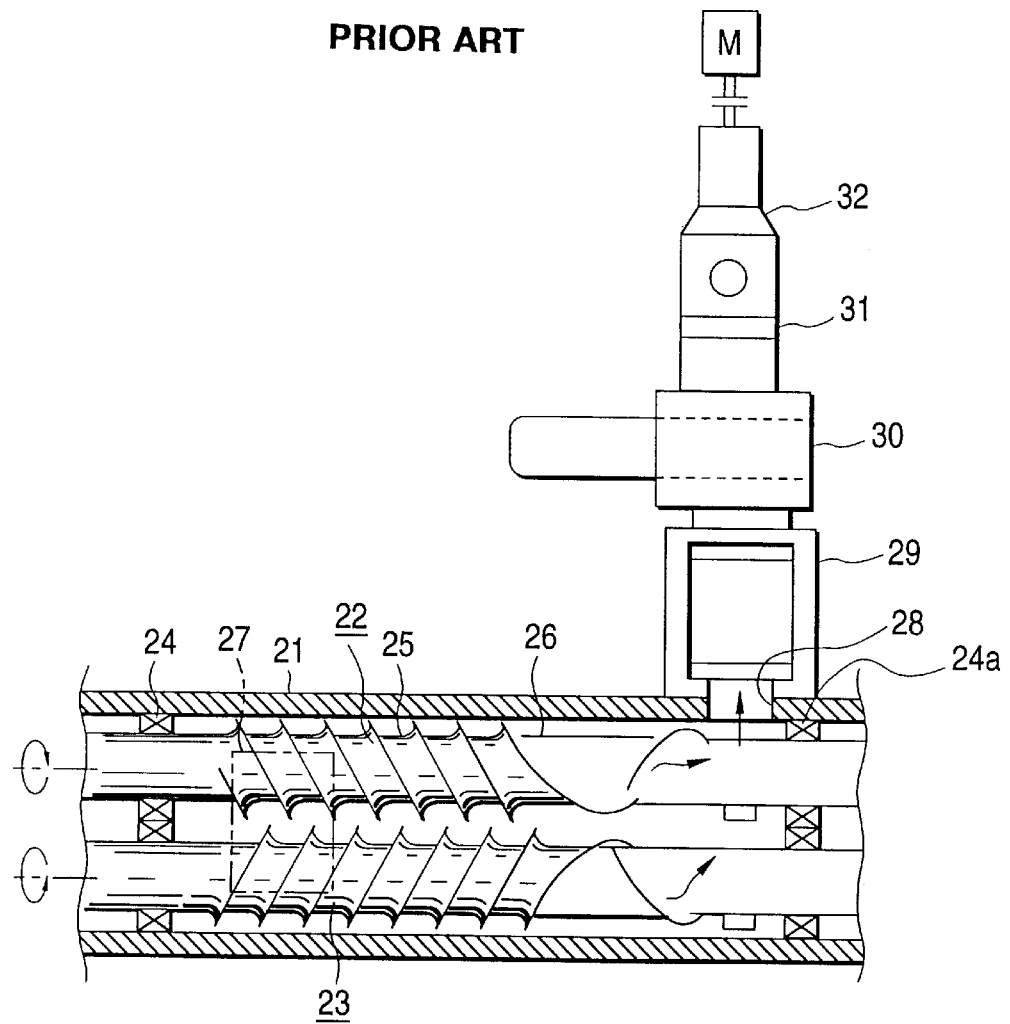
FIG. 3 is showing the whole structure of the prior art twin extruder.

FIG. 1 is a whole structure of the twin extruder according to the present invention, and FIG. 2 is a cross sectional view along A—A line of FIG. 1.

In FIG. 1, reference numeral 1 is a cylinder, and in this cylinder 1, a pair of first screw 2 and a second screw 3 are disposed. Both screws 2, 3 are sealed at both ends thereof with sealing members 4 and supported by not shown bearings.

Both sides of both screws 2, 3 are material conveying sections 5a, 5b having flights of small lead, the downstream sides of the respective material conveying sections 5a, 5b are kneading sections 6a, 6b having flights of large lead, both kneading sections 6a, 6b are connected about the center of the screws 2, 3. Both screws are rotation driven by a not shown motor outward or inward each other (in this case, the flight is the inverse helical lead with respect to the figure), when seeing the upper parts of the screws from a drive source.

The cylinder 1 is provided with material supplying hoppers 7a, 7b at upper portions thereof corresponding to the respective material supplying sections 5a, 5b.

The cylinder 1 is provided with an discharge port 8 at the side or lower part thereof positioned at the center of the screws 2, 3. The discharge port 28 is provided in order with a gear pump 9, a screen changer 10, a die 11 and an underwater cutting apparatus 12.

As shown in FIG.2, a pressure sensor 13 is disposed between the discharge port 8 and the gear pump 9.

The actuation of the above mentioned twin extruder will be explained.

Resin materials of the same amount are charged into the cylinder 1 from the respective hoppers 7a, 7b, transferred to the material conveying sections 5a, 5b and kneading sections 6a, 6b, and are molten and kneaded. The molten and kneaded materials are joined at the center of the screws 2, 3, and is rendered to be under a predetermined pressure, sent from the discharge port 8 to the gear pump 9 at the downstream, and goes through the screen changer 10, the die 11 and the underwater cutting apparatus 12, and is pelletized.

As the present invention is composed as mentioned above, the following effects may be brought about.

(*a*) The sealing of the axes of the screws is sufficient only at the side of charging the resin material, and being under non pressure, the sealing may be easily completed.

(b) Since the thermal expansion of the cylinder may be absorbed at the side of the hopper, the center of the underwater cutting apparatus and such may be fixed, so that the centering thereof is made easy.

(c) Twice processing amount may be secured in relation with the prior art screw diameter, and large downsize may be available.

What is claimed is:

1. A twin extruder comprising:

a cylinder accommodating twin screws therein, both ends of said twin screws being supported and said twin screws rotating in opposite directions;

an underwater cutting apparatus connected to a discharge port of a cylinder through a gear pump;

material conveying sections having flights of first lead, said material conveying sections positioned at both sides of both screws; and kneading section having flights of second lead which is bigger than first lead, said kneading section positioned at the downstream sides of the respective material conveying sections, both kneading sections being connected approximately at the center of the screws, said cylinder positioned at the center of the screws being provided with the discharge port.

2. The twin extruder as claimed in claim 1, wherein the cylinder is provided with material supplying hoppers at upper portions thereof corresponding to the respective material supply sections.

3. The twin extruder as claimed in claim 2, wherein said flights of both screws are inverse helical screws with respect to each other, and each of the screws is made an inverse helical screw symmetrically at the center thereof.

4. The twin extruder as claimed in claim 1, wherein said flights of both screws are inverse helical screws with respect to each other, and each of the screws is made an inverse helical screw symmetrically at the center thereof.

\* \* \* \* \*